United States Patent
Nuggehalli et al.

(10) Patent No.: US 12,253,611 B2
(45) Date of Patent: Mar. 18, 2025

(54) SIGNALING FOR EPHEMERIS INFORMATION

(71) Applicant: Apple Inc., Cupertino, CA (US)

(72) Inventors: Pavan Nuggehalli, San Carlos, CA (US); Fangli Xu, Beijing (CN); Alexander Sirotkin, Tel-Aviv (IL); Chunxuan Ye, San Diego, CA (US); Haijing Hu, Los Gatos, CA (US); Naveen Kumar R. Palle Venkata, San Diego, CA (US); Ralf Rossbach, Munich (DE); Sarma V. Vangala, Campbell, CA (US); Sethuraman Gurumoorthy, San Ramon, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 360 days.

(21) Appl. No.: 17/438,324

(22) PCT Filed: Aug. 4, 2021

(86) PCT No.: PCT/CN2021/110684
§ 371 (c)(1),
(2) Date: Sep. 10, 2021

(87) PCT Pub. No.: WO2023/010365
PCT Pub. Date: Feb. 9, 2023

(65) Prior Publication Data
US 2023/0044346 A1    Feb. 9, 2023

(51) Int. Cl.
*G01S 19/25*  (2010.01)
*H04M 15/00*  (2006.01)
*H04W 76/20*  (2018.01)
*H04W 84/04*  (2009.01)
*H04W 84/06*  (2009.01)

(52) U.S. Cl.
CPC .......... *G01S 19/258* (2013.01); *H04M 15/66* (2013.01); *H04W 76/20* (2018.02); *H04W 84/042* (2013.01); *H04W 84/06* (2013.01)

(58) Field of Classification Search
CPC ...... G01S 19/258; H04W 76/20; H04W 15/66
USPC .................................................. 342/357.66
See application file for complete search history.

(56) References Cited

U.S. PATENT DOCUMENTS

2022/0353794 A1* 11/2022 Shrestha ............... H04W 76/28

FOREIGN PATENT DOCUMENTS

| CN | 105301609 A | 2/2016 | |
|---|---|---|---|
| CN | 111182658 A | 5/2020 | |
| CN | 111510198 A | 8/2020 | |
| EP | 3255460 A1 * | 12/2017 | ............. G01S 19/03 |
| WO | 2021139665 A1 | 7/2021 | |

(Continued)

OTHER PUBLICATIONS

On UL time and frequency synchronization enhancements for NTN, 3GPP TSG RAN WG1 Meeting #104-e, R1-2100927, Jan. 25-Feb. 5, 2021, 22 pages.

(Continued)

*Primary Examiner* — Harry K Liu
(74) *Attorney, Agent, or Firm* — Kilpatrick Townsend & Stockton LLP (57) ABSTRACT

The present application relates to devices and components including apparatus, systems, and methods for ephemeris signaling in wireless networks.

18 Claims, 8 Drawing Sheets

(56) References Cited

FOREIGN PATENT DOCUMENTS

| WO | WO-2021190526 A1 | * | 9/2021 | ......... | H04B 7/18519 |
| WO | WO-2022084946 A1 | * | 4/2022 | ......... | H04B 7/18519 |
| WO | WO-2022205014 A1 | * | 10/2022 | ......... | H04B 7/18513 |

OTHER PUBLICATIONS

UE Time and frequency Synchronisation for NR-NTN Document for: Discussion and Decision, 3GPP TSG RAN WG1 Meeting #104e, R1-2100595, Jan. 25-Feb. 5, 2021, 17 pages.

Solutions for NR to support non-terrestrial networks (NTN), CATT, 3GPP TSG RAN Meeting #91-e, RP-211557, Mar. 22-26, 2021, 10 pages.

3rd Generation Partnership Project; Technical Specification Group Services and System Aspects; System architecture for the 5G System (5GS); Stage 2 (Release 17), 3GPP TS 23.501 V17.1.1, Jun. 2021, 526 pages.

3rd Generation Partnership Project; Technical Specification Group Services and System Aspects; Policy and charging control framework for the 5G System (5GS); Stage 2 (Release 17), 3GPP TS 23.503 V17.1.0, Jun. 2021, 137 pages.

3rd Generation Partnership Project; Technical Specification Group Core Network and Terminals; Non-Access-Stratum (NAS) protocol for 5G System (5GS); Stage 3 (Release 17), 3GPP TS 24.501 V17.3.1, Jun. 2021, 825 pages.

3rd Generation Partnership Project; Technical Specification Group Radio Access Network; NR; NR and NG-RAN Overall Description; Stage 2 (Release 16), 3GPP TS 38.300 V16.6.0, Jun. 2021, 152 pages.

3rd Generation Partnership Project; Technical Specification Group Radio Access Network; NR; Radio Resource Control (RRC) protocol specification (Release 16), 3GPP TS 38.331 V16.5.0, Jun. 2021, 959 pages.

Considerations on Satellite Ephemeris, Thales, 3GPP TSG RAN WG2 eMeeting #111-e R2-2007574, Aug. 28, 2020, 5 pages.

HAPS-Satellite Ephemeris Broadcast, Loon, Google, 3GPP TSG-RAN WG2 Meeting#111e R2-2006924, Aug. 28, 2020, 3 pages.

International Patent Application No. PCT/CN2021/110684, International Search Report and Written Opinion, May 7, 2022, 9 pages.

International Patent Application No. PCT/CN2021/110684, International Preliminary Report on Patentability, Feb. 15, 2024, 6 pages.

* cited by examiner

```
┌─────────────────────────────────────────────────────────────────┐
│ Generating uplink NAS transport message to include an indication that │
│ UE supports storage of ephemeris or to request ephemeris information  │
│                              304                                │
└─────────────────────────────────────────────────────────────────┘
                                 │
                                 ▼
┌─────────────────────────────────────────────────────────────────┐
│           Transmitting the uplink NAS transport message to AMF          │
│                              308                                │
└─────────────────────────────────────────────────────────────────┘
                                 │
                                 ▼
┌─────────────────────────────────────────────────────────────────┐
│         Receiving message with meta-information related to ephemeris   │
│                              312                                │
└─────────────────────────────────────────────────────────────────┘
```

SIGNALING FOR EPHEMERIS INFORMATION

CROSS-REFERENCES TO RELATED APPLICATIONS

This application is a U.S. National Stage Application of PCT/CN2021/110684, filed Aug. 4, 2021. The disclosure of which is herein incorporated by reference in its entirety for all purposes.

BACKGROUND

As wireless networks have developed, the networks have developed to service more areas and more remote areas. An approach that has been proposed for the wireless networks to service more areas and more remote areas is the utilization of non-terrestrial networks. In particular, satellites may be utilized within the networks to provide radio access network (RAN) service. The use of the satellites within the networks presents many challenges.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

Wireless networks have developed to include non-terrestrial networks (NTNs) for providing wireless area network (WAN) service to user equipments (UEs). Ephemeris information may describe orbital paths and locations of non-terrestrial components including, for example, satellites or high-altitude platform systems (HAPS). The ephemeris information may be used: for mobility and measurement operations in cell selection, cell re-selection, and conditional handover (CHO); for time and frequency pre-compensation to account for UE-to-base station round trip time and Doppler shift for random access; and to indirectly signal network and satellite type (for example, TN, NTN GEO, NTN LEO) or timing information on when a cell is going to stop serving an area. Embodiments herein describe signaling of ephemeris and related information in New Radio (NR) networks.

Figure 1:
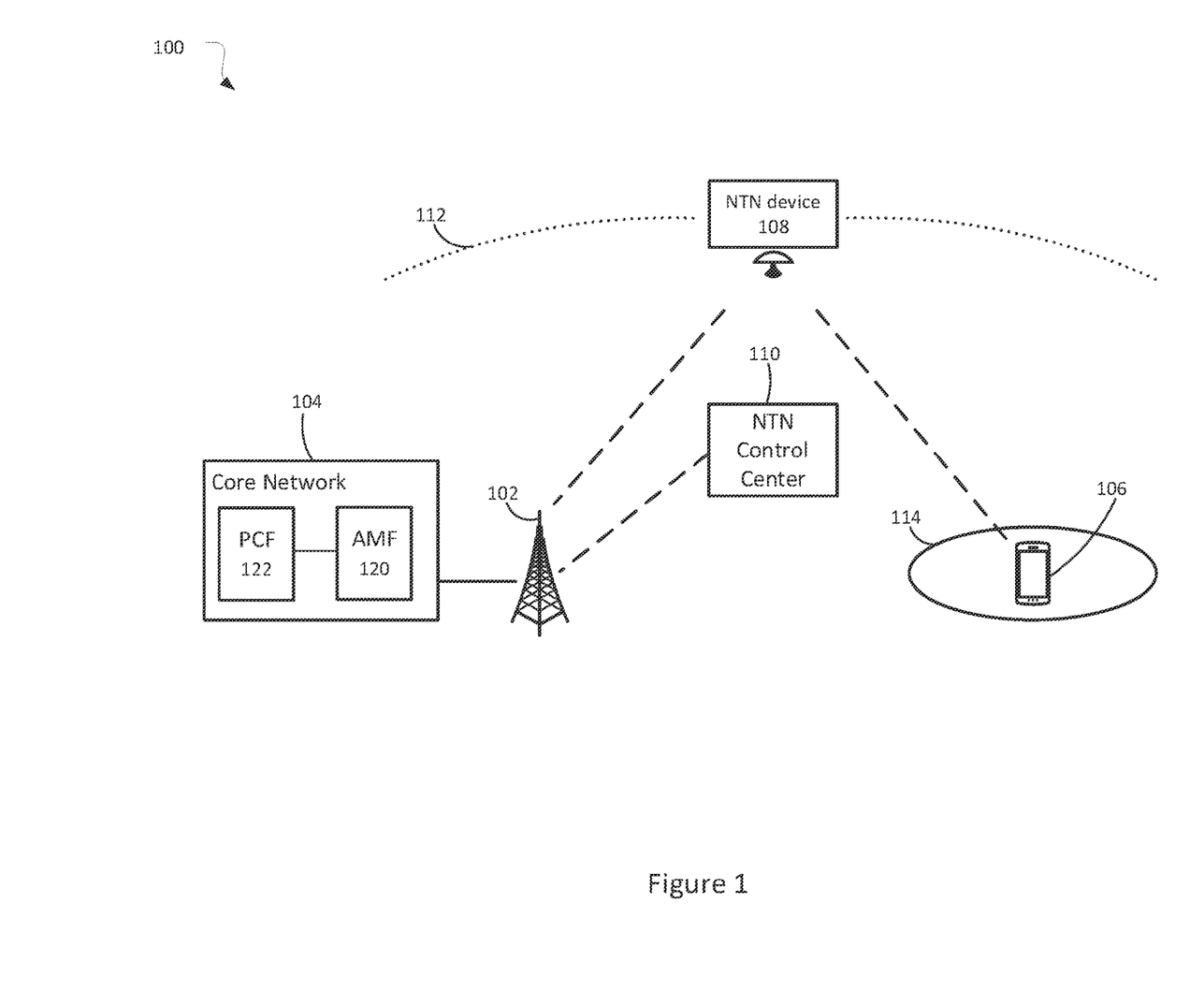
FIG. 1 illustrates a network arrangement in accordance with some embodiments.

FIG. 1 illustrates an example network arrangement 100 in accordance with some embodiments. In particular, the network arrangement 100 illustrates an example NTN that may implement the approaches described herein. The NTN illustrated in the network arrangement 100 is a simplified version illustrating a single representation of each element for clarity and brevity. It should be understood that one or more of each of the elements may be present in embodiments of the network arrangement 100.

The network arrangement 100 may include a base station 102. The base station 102 may, in combination with other components within the network arrangement 100, provide WAN services to UEs. The base station 102 may comprise a nodeB. For example, the base station 102 may comprise a next generation nodeB (gNB), an evolved nodeB (eNB), or another type of nodeB.

The network arrangement 100 may further include a core network (CN) 104. For example, the CN 104 may comprise a $5^{th}$ Generation Core network (5GC). The CN 104 may be coupled to the base station 102 via a fiber optic or wireless backhaul. The CN 104 may provide functions for the UEs that form a connection with the base station 102, such as subscriber profile information, subscriber location, authentication of services, and/or switching functions for voice and data sessions. The CN 104 may include an access and mobility management function (AMF) 120 that acts as a control plane function to provide registration management, connection management, reachability management, and mobility management services. The CN 104 may further include a policy control function (PCF) 122 to provide policies associated with mobility management and session management. The functions of the CN 104, including the AMF 120 and the PCF 122, may be involved in non-access stratum (NAS) messaging of the network arrangement 100 as will be further described.

The network arrangement 100 may further include a UE 106. The UE 106 may be configured to establish a connection with a WAN and provide services of the WAN to a user of the UE 106. For example, the UE 106 may be configured to establish a wireless connection to a portion of a WAN, such as the base station 102.

The network arrangement 100 may further include an NTN device 108. For example, the NTN device 108 may comprise an earth-fixed satellite (such as a geosynchronous (GEO) earth orbit satellite or a high altitude platform station (HAPS)), a quasi-earth-fixed satellite (such as a non-geostationary Earth orbit (NGEO) satellite with steerable beam), or an Earth-moving satellite (such as an NGEO with fixed or non-steerable beam). The NTN device 108 may proceed along a course 112 during operation.

The NTN device 108 may facilitate a wireless connection between the base station 102 and the UE 106 by relaying signals between the two network devices. The signals may be relayed over a first service link between the NTN device 108 and the base station 102 and a second service link between the NTN device 108 and the UE 106. The base station 102 or the UE 106 may benefit from having ephemeris information regarding the position or the course 112 of the NTN device 108 to establish and maintain these service links. In legacy embodiments, there is no agreed definition of ephemeris information and no agreed method to deliver the ephemeris information to the UE 106.

The network arrangement 100 may support Earth-fixed, quasi-Earth-fixed, and Earth-moving satellite service links. For Earth-fixed satellite service links, provision by beam(s) continuously covering the same geographical areas all the time (for example, the case of GEO satellites and HAPS) may be implemented. For quasi-Earth-fixed satellite service links, provision by beam(s) covering one geographic area for a finite period and a different geographic area during another period (for example, the case of NGEO satellites generating steerable beams) may be implemented. For Earth-moving satellite service links, provision by beam(s) which foot print slides over the Earth surface (for example, the case of NGEO satellites generating fixed or non-steerable beams).

The network arrangement 100 may further include a NTN control center 110. The NTN control center 110 may store the ephemeris information regarding the position or the course of one or more NTN devices within a constellation of NTN devices. As an example, the NTN control center 110 may store information regarding the position or the course of the NTN device 108 in the illustrated embodiment.

The ephemeris parameters, and brief explanations, are included in Table 1 in accordance with some embodiments.

TABLE 1

| Parameter | Explanation |
| --- | --- |
| $t_{oe}$ | Ephemerides reference epoch in seconds within the week |
| $\sqrt{a}$ | Square root of semi-major axis |
| e | Eccentricity |
| $M_O$ | Mean anomaly at reference epoch |
| ω | Argument of perigee |
| $i_O$ | Inclination at reference epoch |
| $\Omega_O$ | Longitude of ascending node at the beginning of the week |
| Δn | Mean motion difference |
| $\dot{i}$ | Rate of inclination angle |
| $\dot{\Omega}$ | Rate of node's right ascension |
| $C_{uc}, C_{us}$ | Latitude argument correction |
| $C_{rc}, C_{rs}$ | Orbital radius correction |
| $C_{ic}, C_{is}$ | inclination correction |

The ephemeris, which may also be referred to as orbital position information, may be divided into slow-changing ephemeris and fast-changing ephemeris.

The slow-changing ephemeris, or simply "slow ephemeris," may include coarse information that may also be referred to as almanac information. Generally, the slow ephemeris may provide the information about which satellites from a constellation are currently visible, trajectory information, or other information that does not change rapidly. The slow ephemeris may provide information that is valid for several hours to several days. Slow ephemeris may allow a device to determine coarse Earth print WAN coverage provided by the NTN device 108 in combination with the base station 102. In some embodiments, the slow ephemeris may include $t_{oe}$, $\sqrt{a}$, e, $M_o$, ω, $i_o$, and $\Omega_O$, of Table 1. In other embodiments, the slow ephemeris may include additional/alternative parameters.

The fast-changing ephemeris, or simply "fast ephemeris," may provide a more precise satellite orbital position or coverage information. The fast ephemeris may provide information that is valid for less than a few hours. In some embodiments, the fast ephemeris may include ephemeris corrections or account for antenna beam steering parameters, which may only be valid for a few seconds to a few minutes. Fast ephemeris may allow a device to determine a precise Earth print WAN coverage provided by the NTN device 108 in combination with the base station 102. In some embodiments, the fast ephemeris may include Δn, $\dot{i}$, $\dot{\Omega}$, $c_{uc}, c_{us}$, and $c_{ic}, c_{is}$ of Table 1. In other embodiments, the fast ephemeris may include additional/alternative parameters.

In general, slow ephemeris may be differentiated by fast ephemeris by a validity period of the associated information. The slow ephemeris may include the information that includes a validity period more than a threshold period, and the fast ephemeris may include the information that includes a validity period less than the threshold period. In some embodiments, the threshold may be three hours. In some embodiments, a plurality of thresholds may be used to define more than two types of ephemeris. For example, slow ephemeris may have validity periods of 3 hours or more; level-one fast ephemeris may have validity periods between 120 seconds and 3 hours; and level-two fast ephemeris may have validity periods less than 120 seconds. It will be understood that any number of types of ephemeris may be defined in this manner.

In some embodiments, the base station 102 may retrieve the ephemeris information for a serving cell (for example, the NTN device 108) and one or more neighbor cells from the NTN control center 110. The base station 102 may then provide some or all of the ephemeris information to the UE 106. The UE 106 may utilize the ephemeris information to determine positional information for the NTN device 108 or other NTN devices that provide neighbor cell coverage. The positional information determined may include an Earth print WAN coverage of the NTN device 108 in combination with the base station 102. The UE 106 may utilize one or more equations well known in the field with the ephemeris information to identify a position of the NTN device 108 or its Earth print WAN coverage 114. The Earth print WAN coverage 114 may define an area for which the NTN device 108 is to provide radio access coverage for a cell of the base station 102.

In some embodiments, the base station 102 may broadcast the ephemeris information in system information (SI) messages. The SI messages may include a master information block (MIB) or one or more system information blocks (SIBs).

SI messages may have a periodicity as high as 5.12 seconds for embodiments that use a 15 kHz subcarrier spacing. In general, updating the ephemeris every few tens of seconds is likely sufficient for desired operation including time and frequency pre-compensation. However, in some situations it may not be sufficient. For example, if the UE 106 is responding to a paging or initiating a mobile terminated (MT) session (for example, for a voice call) it may not be able to wait a few seconds to acquire ephemeris, perform time and possibly frequency pre-compensation, and then perform random access. Thus, in some scenarios, at least portions of the ephemeris may need to be mapped to SI messages having a much lower periodicity of, for example, 80 milliseconds.

The UE 106 may store ephemeris as long as the information is valid and not stale. The length of the validity of the ephemeris may be a function of the type of information that is broadcast (for example, fast or slow ephemeris) as well as system implementation.

Embodiments describe a dynamic system that provides ephemeris in system information while reducing UE energy consumption impact in idle mode by, for example, reducing unnecessary SI acquisition. Various embodiments may be adaptable to timely deliver ephemeris having a wide range of validity periods through SI messages. These embodiments may be defined in a manner such that UE performance is not penalized. For example, the UE 106 may be capable of performing initial access within desired latency constraints.

While some embodiments describe transmitting ephemeris in radio resource control (RRC) messages such as, SI messages, other embodiments describe utilizing other mechanisms to transmit ephemeris. For example, certain types of ephemeris information may be delivered from the core network 104 through NAS signaling, while other types of ephemeris or related information may be delivered from the base station 102 in RRC messages.

NAS-based ephemeris delivery aspects may include enhancements to UE policy delivery. The PCF 122 may use 5G NAS signaling to deliver a variety of UE policies including, for example, UE route selection policy (URSP), access network discovery and selection policy (ANDSP), and vehicle to everything policy (V2XP).

Various features of the UE policy service may also be beneficial to delivering ephemeris information. One of these attractive features includes support of segmentation using UE policy section identifier (UPSI) and UE policy section code (UPSC). This may allow information to be of an arbitrary size. Another attractive feature is native support for modifying, deleting, and providing content. These and other features of UE policy service may be leveraged for transmitting ephemeris.

Figure 2:
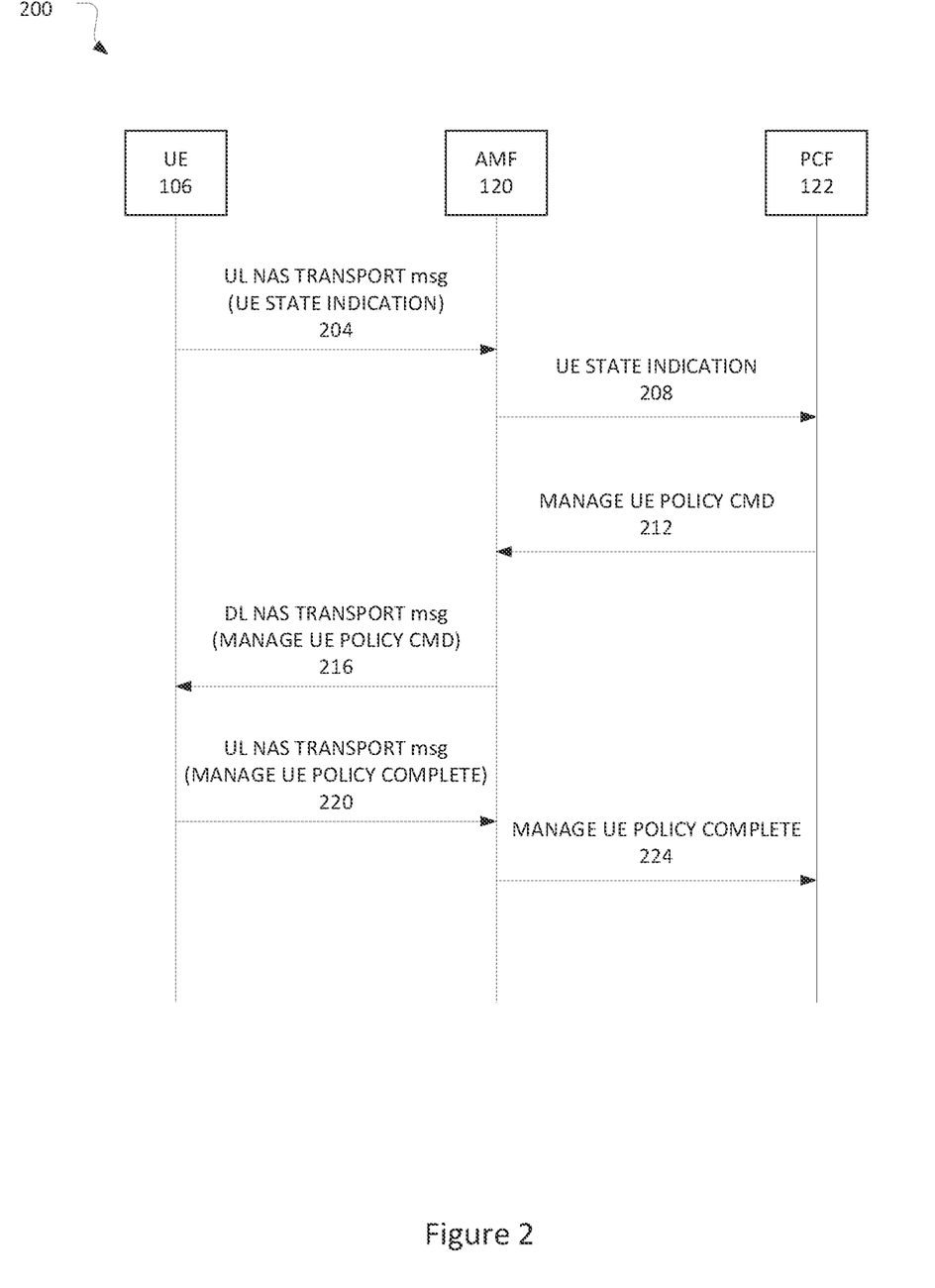
FIG. 2 illustrates a signaling procedure in accordance with some embodiments.

FIG. 2 is a signaling procedure 200 that illustrates NAS-based delivery of ephemeris information in some embodiments. The signaling procedure 200 may include messages transmitted between the UE 106, the AMF 120, and the PCF 122.

The signaling procedure 200 may include, at 204, the UE transmitting a UL NAS TRANSPORT message to the AMF 120 to initiate a NAS transport procedure. The NAS transport procedure may be initiated to transport a payload, such as a UE policy container, between the UE 106 and the AMF 120.

The UL NAS TRANSPORT message may include a UE STATE INDICATION message that is to: deliver UPSI(s) of the UE policy section(s) stored in the UE 106; indicate whether the UE supports ANDSP; or deliver one or more operating system (OS) identities of the UE 106. In some embodiments, the UE STATE INDICATION message may be in a field of a UE policy container.

In some embodiments, the UE STATE INDICATION message may be updated to include ephemeris related information. For example, the UE STATE INDICATION message may: include an indication of whether the UE 106 support storage of ephemeris; request ephemeris from a specific type of satellite system (for example, an orbital type such as low-Earth orbit (LEO), medium-Earth orbit (LEO), or GEO); or request ephemeris from specific satellite systems, which may be identified by a public land mobile network (PLMN) identifier or some other identifier.

The signaling procedure 200 may further include, at 208, the AMF 120 forwarding the UE STATE INDICATION to the PCF 122.

The signaling procedure 200 may further include, at 212, the PCF 122 transmitting a MANAGE UE POLICY COMMAND message to the UE 106 through the AMF 120. The MANAGE UE POLICY COMMAND message may be sent to the UE 106 to request that the UE 106 manage UE policy sections. The MANAGE UE POLICY COMMAND message may include an identity field that identifies a UE policy delivery service message type, and may also include a list of UE policy sections that the UE is requested to manage.

In some embodiments, the MANAGE UE POLICY COMMAND message may provide ephemeris information requested in the UE STATE INDICATION or other ephemeris information. The ephemeris information may include ephemeris parameters or meta-information related to ephemeris. The meta-information may include, for example, satellite system identity and type; ephemeris format (for example, orbital format or Earth-centered, Earth fixed (ECEF) format); validity time (after which the information may be considered stale or obsolete); or ephemeris granularity (for example, fast ephemeris, slow ephemeris, or both fast and slow ephemeris).

The MANAGE UE POLICY COMMAND message may be a field of a UE policy container that is a payload transmitted from the PCF 122 to the UE 106. The ephemeris information may be part of the UE policy container itself, or specified as additional fields in the MANAGE UE POLICY COMMAND message.

The AMF 120 may generate a DL NAS TRANSPORT message to include the MANAGE UE POLICY COMMAND message, which is then transmitted to the UE 106 at 216.

The UE 106 may generate a UL NAS TRANSPORT message that includes a MANAGE UE POLICY complete message to indicate that all the received instructions were successfully executed at the UE 106. The MANAGE UE POLICY COMPLETE message may include a procedure transaction identity and an identity field that identifies a UE policy delivery service message type.

While the signaling procedure of FIG. 2 is shown generally as a UE-initiated NAS transport procedure, other embodiments may transmit ephemeris information using a network-initiated NAS transport procedure. In general, given that the policy information is provided relatively infrequently, the NAS-based delivery may be more suitable for slow ephemeris. However, embodiments are not to be limited as such.

Figure 3:
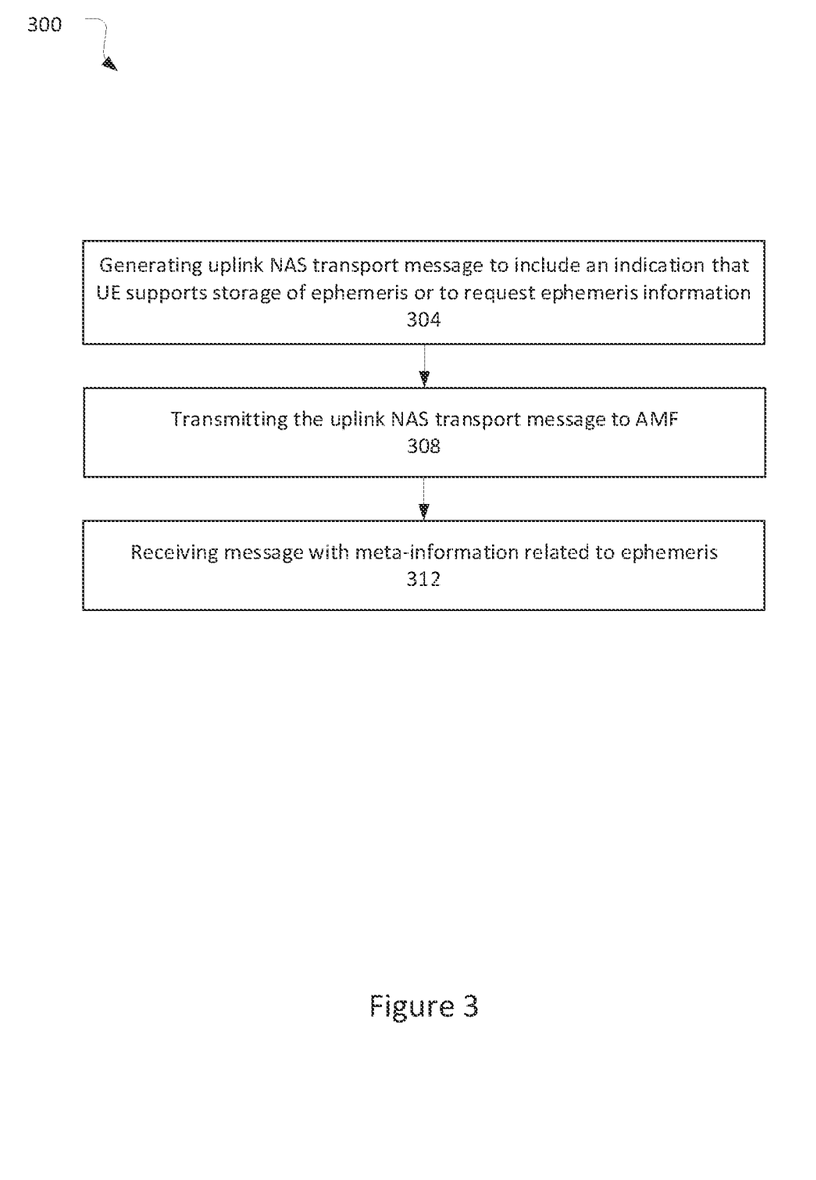
FIG. 3 illustrates an operational flow/algorithmic structure in accordance with some embodiments.

FIG. 3 illustrates an operational flow/algorithmic structure 300 in accordance with some embodiments. The operation flow/algorithmic structure 300 may be performed or implemented by a UE such as, for example, UE 106 or 700; or components thereof, for example, baseband processor 704A The operation flow/algorithmic structure 300 may include, at 304, generating an uplink NAS transport message to include an indication that the UE supports storage of ephemeris or to request ephemeris information. The requested information may include a request for ephemeris from specific types of satellite systems such as, for example, LEO, GEO, or MEO systems. The requested information may additionally/alternatively include a request for ephemeris from specific satellite systems that are associated with an identifier in the uplink NAS transport message. The identifier may be a PLMN identifier in some embodiments.

In some embodiments, the uplink NAS transport message may include a UE policy container or UE state indication as described above with respect to message 204 of FIG. 2.

The operation flow/algorithmic structure 300 may further include, at 308, transmitting the uplink NAS transport message to an AMF.

The operation flow/algorithmic structure 300 may further include, at 312, receiving a message with ephemeris or meta-information related to the ephemeris. The message may include information that is specifically requested by the uplink NAS transport message or may include other types of information. The information may be associated with a satellite system identity or type and may include an ephemeris format (for example, orbital or ECEF); a validity time after which the information is considered obsolete; or a granularity of ephemeris.

In some embodiments, ephemeris information may be delivered through system information. This may be in addition to, or as an alternative from, delivering ephemeris information through NAS signaling as described above.

In some embodiments, the ephemeris information may be incorporated into broadcast SIBs. Ephemeris broadcast every few seconds to a few minutes is likely sufficient to meet time and frequency synchronization/precompensation requirements for initial access. However, this may also be associated with increased UE power consumption resulting from unnecessary SI modifications.

If the base station 102 changes information in a SIB, it may transmit the modified SIB and trigger an SI modification procedure. The SI modification procedure may include the base station 102 transmitting a SIB1 with a changed system information value tag (systemInfoValueTag) value and transmitting a paging message with a value of a system information modification (systemInfoModification) field set to true.

If the UE 106 detects that the systemInfoValueTag has changed within a modification period, or receives the paging message with the systemInfoModification field set to true, the UE 106 may process SIBs to obtain the updated information. In some instances, this may involve transitioning the UE 106 out of a power-conserving idle mode in discontinuous reception (DRX).

Using the existing SI modification procedure may be adequate for slow ephemeris, which may change on the order of hours or days. However, fast ephemeris may change more rapidly. Requiring the UE to wake up every few seconds, for example, whenever a paging occasion occurs during idle-mode DRX, to acquire the new SI may be power intensive. Thus, embodiments describe separate processes for handling the fast and slow ephemeris in the SIB transmissions.

Figure 4:
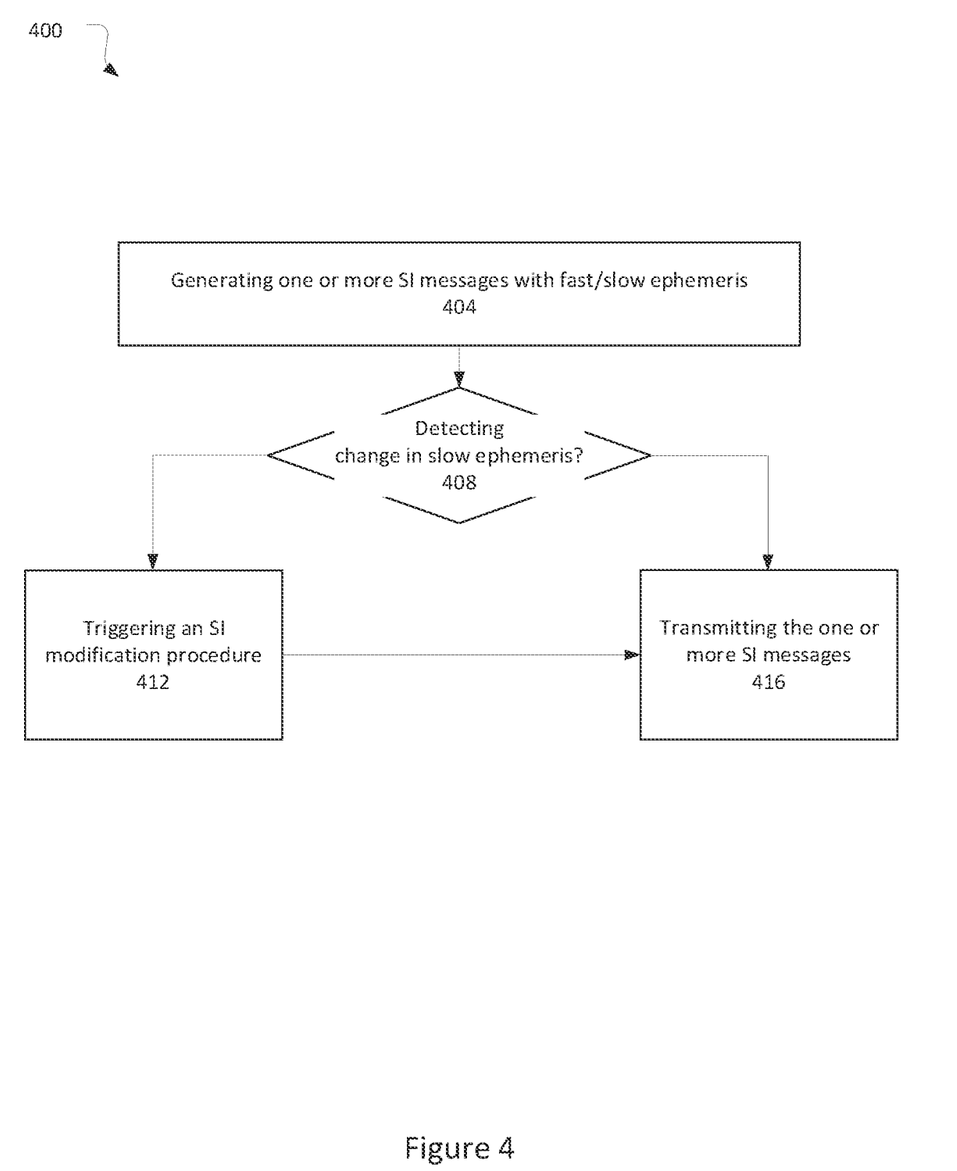
FIG. 4 illustrates another operational flow/algorithmic structure in accordance with some embodiments.

FIG. 4 illustrates an operation flow/algorithmic structure 400 in accordance with some embodiments. The operation flow/algorithmic structure 400 may be performed or implemented by a base station such as, for example, base station 102 or 800; or components thereof, for example, baseband processor 804A.

The operation flow/algorithmic structure 400 may include, at 404, generating one or more SI messages with fast/slow ephemeris. In some embodiments, the SI messages may include separate SIBs to carry the fast and slow ephemeris. For example, a SIBslow may carry slow ephemeris and a SIBfast may carry fast ephemeris. These SIBs may be transmitted together or separately. In some embodiments, the SIBslow and the SIBfast may be transmitted with different periodic transmission patterns. For example, the SIBslow may be transmitted with a higher period (for example, less frequently) and the SIBfast may be transmitted with a lower period (for example, more frequently).

In some embodiments, a single SIB may be defined to carry both the fast and slow ephemeris. This SIB, which may be referred to as SIBephem, may include a first set of fields for the fast ephemeris parameters and a second set of fields for the slow ephemeris parameters.

The slow/fast ephemeris may correspond to a serving cell or a neighbor cell. In some embodiments, the serving and neighbor cell ephemeris may be broadcast in a same SIB, in separate SIBs, or in a part of the SIBs that are used for cell reselection.

The operation flow/algorithmic structure 400 may further include, at 408, detecting for a change in slow ephemeris. The change may be a change in the SIBslow or a change in the second set of fields of a SIBephem. If a change is detected in the slow ephemeris, the operation flow/algorithmic structure 400 may advance to triggering an SI modification procedure at 416. This SI modification procedure may include the base station transmitting a SIB1 with a changed systemInfoValueTag value and transmitting a paging message with a value of a systemInfoModification field set to true. The operation flow/algorithmic structure 400 may then advance to transmitting the one or more SI messages (including the modified SIB) at 416

If, at 408, no change to the slow ephemeris is detected, the operation flow/algorithmic structure 400 may advance to transmitting the one or more SI messages at 416. This may be the case whether or not the fast ephemeris changed. Thus, in this situation, the one more SI messages may include unmodified slow ephemeris and either modified or unmodified fast ephemeris.

In this manner, if the base station detects a change in the slow ephemeris, carried by a SIBslow or the second set of fields of the SIBephem, it may trigger the SI modification procedure. Given that changes to the slow ephemeris will not happen very frequently, it may be acceptable to use the existing SI modification procedure to notify the UE of changes.

If, on the other hand, the base station detects a change in the fast ephemeris, carried by the SIBfast or the first set of fields, it may refrain from triggering the SI modification procedure. Because the UE is not actively notified of changes to the fast ephemeris, it may read SIBfast or the first fields of SIBephem only when it intends to perform an operation that is based on the fast ephemeris. For example, the UE may read the SIBfast or the first fields of SIBephem when it intends to perform an initial access or RRM procedures.

In some embodiments, changes in ephemeris (either fast or slow) do not trigger the SI modification procedure. Rather, the UE 106 is expected to read current ephemeris based on network indications.

Figure 5:
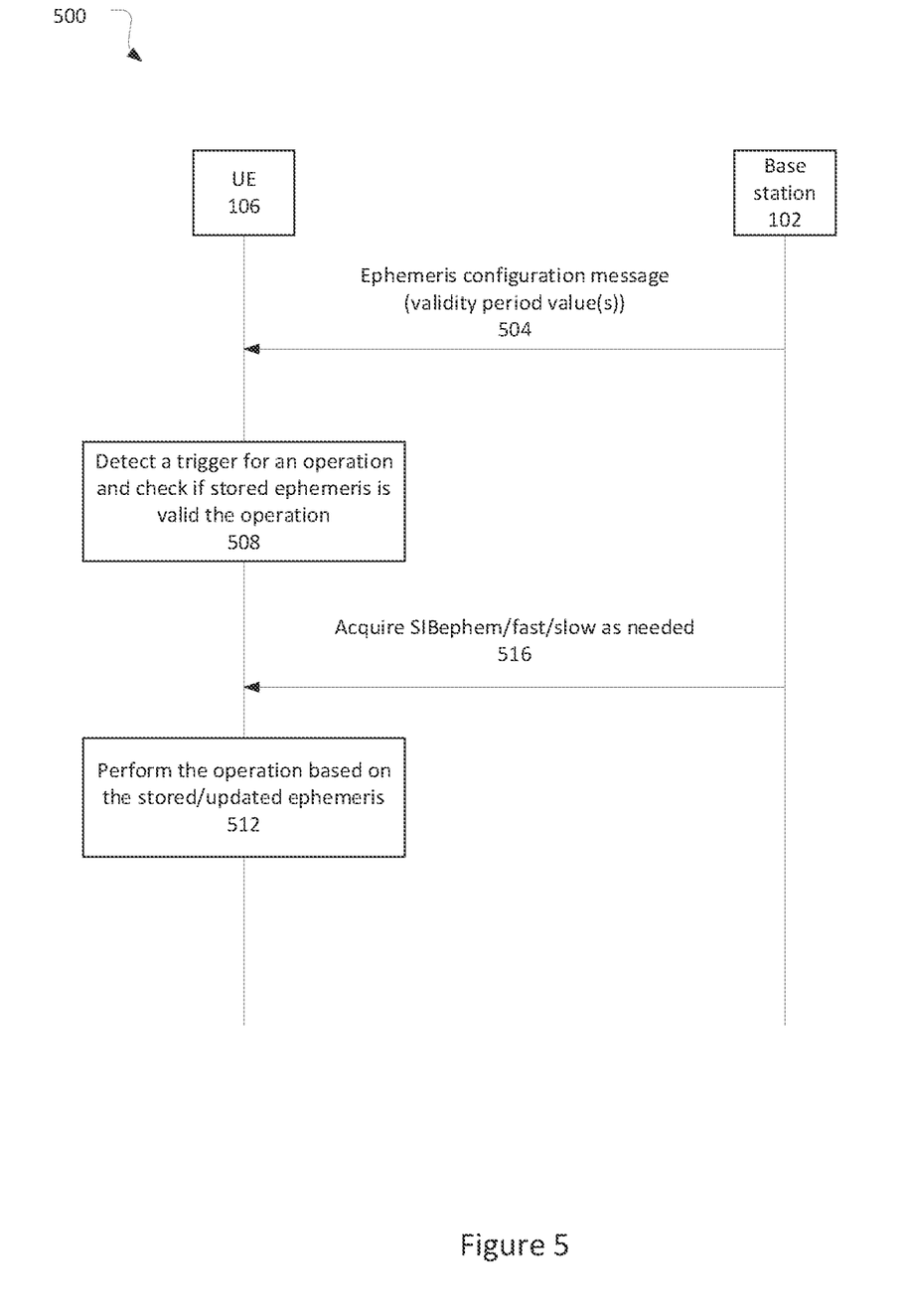
FIG. 5 illustrates a signaling procedure in accordance with some embodiments.

FIG. 5 is a signaling procedure 500 that illustrates periodic acquisition of broadcast ephemeris information in accordance with some embodiments. The signaling procedure 500 may include messages transmitted between the UE 106 and the base station 102.

The signaling procedure 500 may include, at 504, the base station 102 transmitting an ephemeris configuration message to the UE 106. The ephemeris configuration message may include validity period values that correspond to different ephemeris parameters. The validity period values may define a validity period for respective ephemeris parameters.

The validity period values may correspond to the parameters with different levels of granularity. For example, in one embodiment, a validity period value may correspond to each parameter. In another embodiment, a validity period value may correspond to a set of more than one parameters. For example, one validity period value may correspond to fast ephemeris and one validity period value may correspond to slow ephemeris. It will be understood that the more than two sets of the parameters may be established and associated with respective validity period values.

The validity period values may be transmitted together with corresponding ephemeris or separately. The ephemeris configuration message may be a SIB1, a SIBephem/fast/slow, or an RRC reconfiguration message. The validity period values may be stored along with the corresponding ephemeris in memory of the UE 106.

The signaling procedure 500 may further include, at 508, the UE 106 detecting a trigger for an operation and checking whether stored ephemeris is valid for the operation. The operation may include, for example, cell access, cell reselection, or time/frequency pre-compensation.

Determining a validity state of the stored ephemeris may depend on the type of validity period values transmitted at 504. For example, if the validity period values are timer values, the UE 106 may start a timer with the timer value when corresponding new ephemeris is received. The ephemeris may be have an invalid state if the timer is expired when the UE 106 detects the trigger at 508. If the timer is not yet expired, the ephemeris may have a valid state.

In other embodiments, the validity period values may provide an indication of a length of the validity periods. The UE 106 may store a time stamp when the new ephemeris is received. When the UE 106 detects the trigger at 508, it may determine whether a period from the time stamp to a time of trigger detection exceeds the indicated validity period. If so, the corresponding ephemeris may have an invalid state. If not, the corresponding ephemeris may have a valid state.

If the stored ephemeris that is needed for the operation is valid, the signaling procedure 500 may include, at 512, the UE 106 performing the operation based on the stored ephemeris.

If the stored ephemeris that is needed for the operation is invalid, the signaling procedure 500 may include the UE 106 acquiring the ephemeris in SIBephem/fast/slow as needed at 516. The acquisition of the ephemeris at 516 may include receiving/processing appropriate SIBs, for example, SIBephem/fast/slow, that are periodically broadcast by the base station 102. In other embodiments, the UE 106 may request an on-demand SIB by transmitting a request in message 1 or message 3 of a physical random access channel (PRACH) process.

The signaling process 500 may then advance to the UE 106 performing the operation based on the updated ephemeris at 512.

In some embodiments, the UE 106 may determine the validity period values in other ways. For example, the values may be predefined in a 3GPP TS or may be left to UE implementation.

Relying on the SI modification procedure to indicate that ephemeris has been updated may result in the UE acquiring non-ephemeris related system information in the event that only ephemeris parameters have been updated. This may be an inefficient use of resources. Thus, in some embodiments, procedures other than the SI modification may be used to provide a notification that ephemeris is changed.

In some embodiments, a short message transmitted on PDCCH using DCI format 1_0 may be used for the ephemeris change notification. This short message may be transmitted using a paging radio network temporary identifier (P-RNTI) with or without a paging message.

Short messages of present networks are defined in section 6.5 of 3GPP TS 38.331 v16.5.0 (2021 June). The short messages are defined to include bits that indicate a broadcast control channel modification other than SIB6, SIB7, and SIB8; an earthquake and tsunami warning system (ETWS) primary/secondary notification or commercial mobile alert service (CMAS) notification; and, for dynamic spectrum sharing (DCC) operation, an indication that the UE may stop monitoring PDCCH occasions for paging in a paging occasion. One or more of the reserved bits of the short message may be used as an indication that ephemeris has been changed. In some embodiments, a plurality of bits may be used to indicate whether specific ephemeris parameters (or types, e.g., fast or slow parameters) have been changed.

Figure 6:
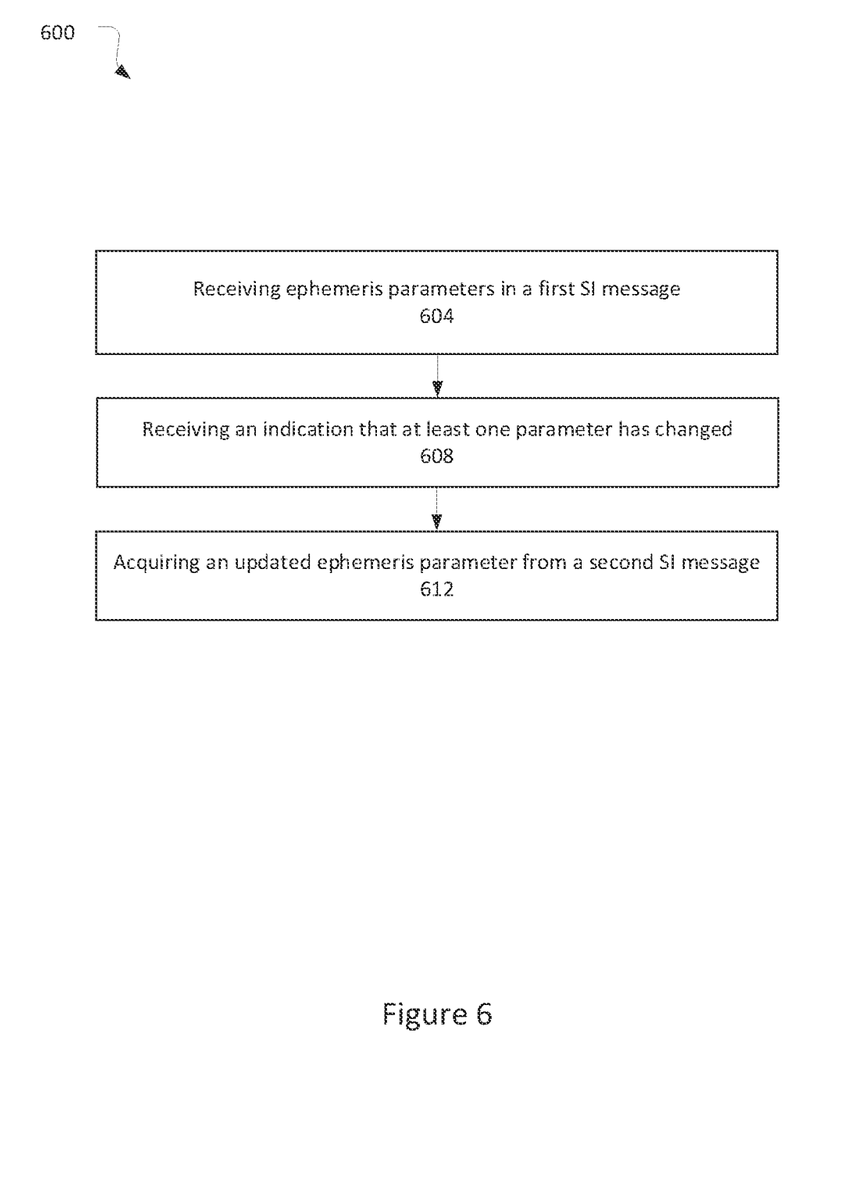
FIG. 6 illustrates another operational flow/algorithmic structure in accordance with some embodiments.

FIG. 6 illustrates an operation flow/algorithmic structure 600 in accordance with some embodiments. The operation flow/algorithmic structure 600 may be performed or implemented by a UE such as, for example, UE 106 or 700; or components thereof, for example, baseband processor 704A.

The operation flow/algorithmic structure 600 may include, at 604, receiving ephemeris parameters in a first SI message. The ephemeris parameters may include fast/slow ephemeris parameters included in a SIBephem/fast/slow.

The operation flow/algorithmic structure 600 may further include, at 608, receiving an indication that at least one parameter has changed. The indication may be a short message indication that is transmitted on PDCCH using P-RNTI with DCI format 1_0.

The operation flow/algorithmic structure 600 may further include, at 612, acquiring an updated ephemeris parameter from a second SI message. The second SI message may include a SIBephem/fast/slow that is periodically broadcast or transmitted on-demand.

In this manner, the UE may, upon detecting the ephemeris change indication in the short message, immediately acquire the related SI message without having to wait for the next modification period.

Figure 7:
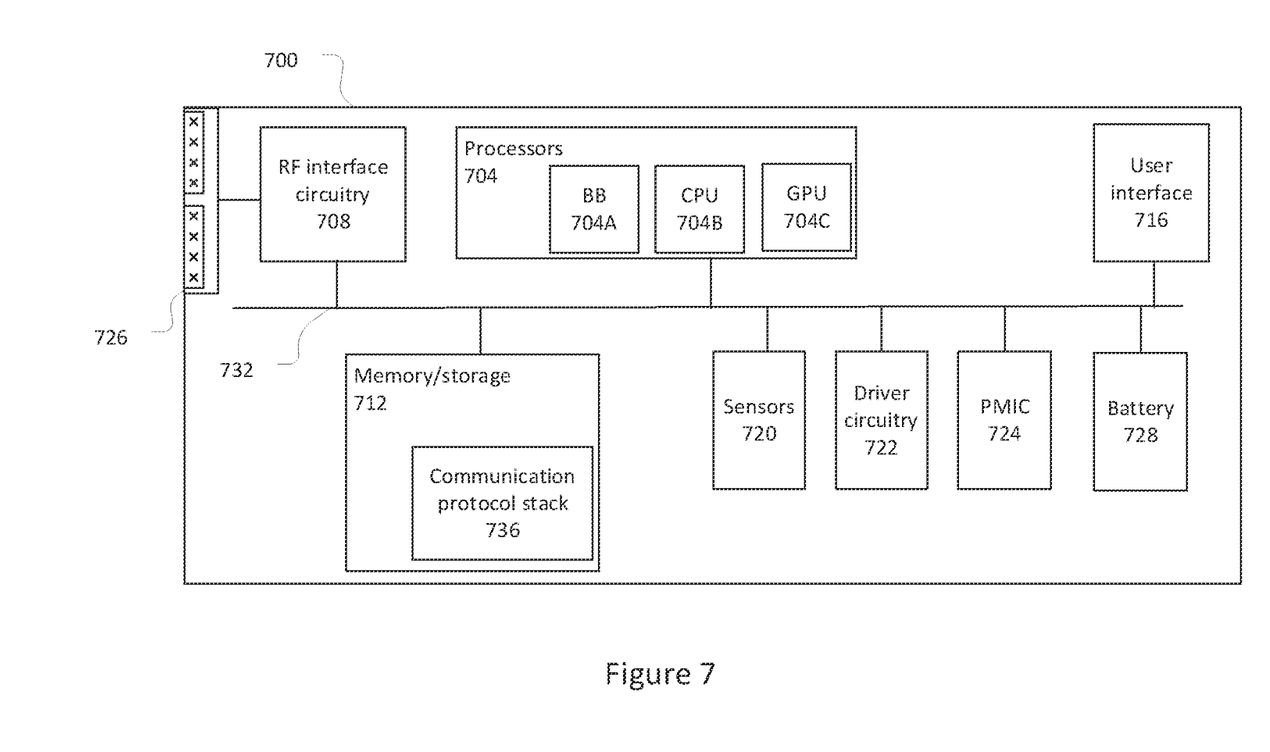
FIG. 7 illustrates a user equipment in accordance with some embodiments.

FIG. 7 illustrates a UE 700 in accordance with some embodiments. The UE 700 may be similar to and substantially interchangeable with UE 74 of FIG. 1.

The UE 700 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 700 may include processors 704, RF interface circuitry 708, memory/storage 712, user interface 716, sensors 720, driver circuitry 722, power management integrated circuit (PMIC) 724, antenna structure 726, and battery 728. The components of the UE 700 may be implemented as integrated circuits (ICs), portions thereof, discrete electronic devices, or other modules, logic, hardware, software, firmware, or a combination thereof. The block diagram of FIG. 7 is intended to show a high-level view of some of the components of the UE 700. However, some of the components shown may be omitted, additional components may be present, and different arrangement of the components shown may occur in other implementations.

The components of the UE 700 may be coupled with various other components over one or more interconnects 732, which may represent any type of interface, input/output, bus (local, system, or expansion), transmission line, trace, or optical connection that allows various circuit components (on common or different chips or chipsets) to interact with one another.

The processors 704 may include processor circuitry such as, for example, baseband processor circuitry (BB) 704A, central processor unit circuitry (CPU) 704B, and graphics processor unit circuitry (GPU) 704C. The processors 704 may include any type of circuitry or processor circuitry that executes or otherwise operates computer-executable instructions, such as program code, software modules, or functional processes from memory/storage 712 to cause the UE 700 to perform operations as described herein.

In some embodiments, the baseband processor circuitry 704A may access a communication protocol stack 736 in the memory/storage 712 to communicate over a 3GPP compatible network. In general, the baseband processor circuitry 704A may access the communication protocol stack 736 to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a NAS layer. In some embodiments, the PHY layer operations may additionally/alternatively be performed by the components of the RF interface circuitry 708.

The baseband processor circuitry 704A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 712 may include one or more non-transitory, computer-readable media that includes instructions (for example, communication protocol stack 736) that may be executed by one or more of the processors 704 to cause the UE 700 to perform various operations described herein. The memory/storage 712 include any type of volatile or non-volatile memory that may be distributed throughout the UE 700. In some embodiments, some of the memory/storage 712 may be located on the processors 704 themselves (for example, L1 and L2 cache), while other memory/storage 712 is external to the processors 704 but accessible thereto via a memory interface. The memory/storage 712 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 708 may include transceiver circuitry and radio frequency front module (RFEM) that allows the UE 700 to communicate with other devices over a radio access network. The RF interface circuitry 708 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 726 and proceed to filter and amplify (with a low-noise amplifier) the signal. The signal may be provided to a receiver of the transceiver that down-converts the RF signal into a baseband signal that is provided to the baseband processor of the processors 704.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 726.

In various embodiments, the RF interface circuitry 708 may be configured to transmit/receive signals in a manner compatible with NR access technologies.

The antenna 726 may include antenna elements to convert electrical signals into radio waves to travel through the air and to convert received radio waves into electrical signals. The antenna elements may be arranged into one or more antenna panels. The antenna 726 may have antenna panels that are omnidirectional, directional, or a combination thereof to enable beamforming and multiple input, multiple output communications. The antenna 726 may include microstrip antennas, printed antennas fabricated on the surface of one or more printed circuit boards, patch antennas, or phased array antennas. The antenna 726 may have one or more panels designed for specific frequency bands including bands in FR1 or FR2.

The user interface circuitry 716 includes various input/output (I/O) devices designed to enable user interaction with the UE 700. The user interface 716 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 700.

The sensors 720 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 722 may include software and hardware elements that operate to control particular devices that are embedded in the UE 700, attached to the UE 700, or otherwise communicatively coupled with the UE 700. The driver circuitry 722 may include individual drivers allowing other components to interact with or control various input/output (I/O) devices that may be present within, or connected to, the UE 700. For example, driver circuitry 722 may include a display driver to control and allow access to a display device, a touchscreen driver to control and allow access to a touchscreen interface, sensor drivers to obtain sensor readings of sensor circuitry 720 and control and allow access to sensor circuitry 720, drivers to obtain actuator positions of electro-mechanic components or control and allow access to the electro-mechanic components, a camera driver to control and allow access to an embedded image capture device, audio drivers to control and allow access to one or more audio devices.

The PMIC 724 may manage power provided to various components of the UE 700. In particular, with respect to the processors 704, the PMIC 724 may control power-source selection, voltage scaling, battery charging, or DC-to-DC conversion.

In some embodiments, the PMIC 724 may control, or otherwise be part of, various power saving mechanisms of the UE 700 including DRX as discussed herein.

A battery 728 may power the UE 700, although in some examples the UE 700 may be mounted deployed in a fixed location, and may have a power supply coupled to an electrical grid. The battery 728 may be a lithium ion battery, a metal-air battery, such as a zinc-air battery, an aluminum-air battery, a lithium-air battery, and the like. In some implementations, such as in vehicle-based applications, the battery 728 may be a typical lead-acid automotive battery.

Figure 8:
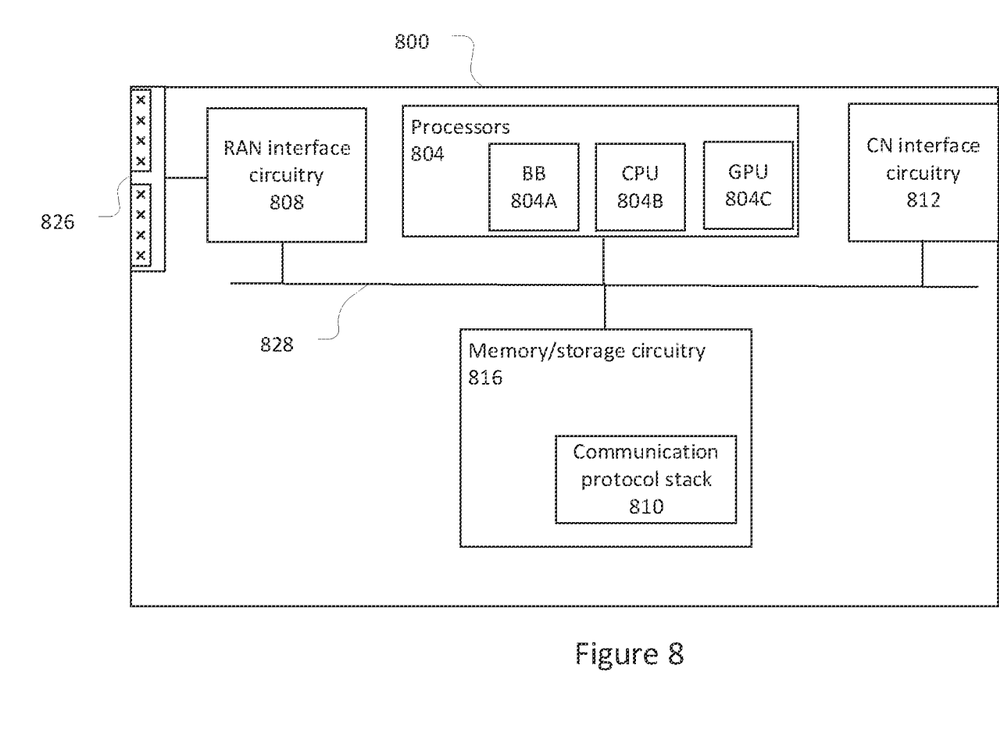
FIG. 8 illustrates a network device in accordance with some embodiments.

FIG. 8 illustrates a network device 800 in accordance with some embodiments. The network device 800 may be similar to and substantially interchangeable with base station 102, AMF 120, or PCF 122 of FIG. 1.

The network device 800 may include processors 804, RF interface circuitry 808 (if implemented as a base station), core network (CN) interface circuitry 812, memory/storage circuitry 816, and antenna structure 826 (if implemented as a base station).

The components of the network device 800 may be coupled with various other components over one or more interconnects 828.

The processors 804, RF interface circuitry 808, memory/storage circuitry 816 (including communication protocol stack 810), antenna structure 826, and interconnects 828 may be similar to like-named elements shown and described with respect to FIG. 7. If the device 800 is implemented as a base station, the communication protocol stack 810 may include access stratum layers. If the network device 800 is implemented as an AMF 120 or PCF 122, the communication protocol stack 810 may include a NAS layer.

The CN interface circuitry 812 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the base station 800 via a fiber optic or wireless backhaul. The CN interface circuitry 812 may include one or more dedicated processors or FPGAs to communicate using one or more of the aforementioned protocols. In some implementations, the CN interface circuitry 812 may include multiple controllers to provide connectivity to other networks using the same or different protocols.

In some embodiments, the base station 800 may be coupled with transmit receive points (TRPs) using the antenna structure 826, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method of operating a user equipment (UE), the method comprising: generating an uplink non-access stratum (NAS) transport message to include an indication that the UE supports storage of ephemeris information or to request ephemeris information; and transmitting the uplink NAS transport message to an access and mobility management function (AMF).

Example 2 includes the method of example 1, wherein the uplink NAS transport message comprises a UE state indication to include the indication that the UE supports storage of ephemeris information or to request ephemeris information.

Example 3 includes the method of example 1, wherein the method comprises: generating the uplink NAS transport message to include an identifier of a satellite system for which ephemeris information is requested.

Example 4 includes the method of example 3, wherein the identifier is to indicate an orbital type of satellite system for which ephemeris information is requested.

Example 5 includes the method of example 3, wherein the identifier is to identify a public land mobile network (PLMN), and the uplink NAS transport message is to request ephemeris information for satellite systems associated with the PLMN.

Example 6 includes the method of example 1, further comprising: receive a message that includes meta-information related to ephemeris information, the meta-information to include an identity or type of satellite system, an ephemeris format, a validity time, or a granularity.

Example 7 includes the method of example 6, wherein the message is a downlink transport message and the meta-information is part of a UE policy container or is a field in a manage UE policy command message.

Example 8 includes a method comprising: generating one or more system information (SI) messages to include first and second ephemeris related to a non-terrestrial network (NTN) device, the first ephemeris being associated with validity periods less than a predetermined threshold and the second ephemeris being associated with validity periods greater than the predetermined threshold; and transmitting the one or more SI messages in an NTN.

Example 9 includes the method of example 8, further comprising: detecting a change in the second ephemeris; and triggering an SI modification procedure based on detecting the change in the second ephemeris.

Example 10 includes the method of example 8, further comprising: detecting a change in the first ephemeris; and refraining from triggering an SI modification procedure based on detecting the change in the first ephemeris.

Example 11 includes the method of example 8, wherein generating the one or more SI messages comprises: generating a first SI block (SIB) to include the first ephemeris; and generating a second SIB to include the second ephemeris.

Example 12 includes the method of example 8, wherein generating the one or more SI messages comprises: generating a first SI block (SIB) having one or more fields for the first ephemeris and at least one field for the second ephemeris.

Example 13 includes the method of example 8, further comprising: transmitting, in the one or more SI messages or a radio resource control (RRC) reconfiguration message, indications of a plurality of validity period values for a corresponding plurality of components of the first and second ephemeris.

Example 14 includes the method of any one of examples 8-13, wherein the first and the second ephemeris is for a serving cell or a neighbor cell.

Example 15 includes the method comprising: storing ephemeris information received in one or more system information (SI) messages; detecting a trigger of an operation that is based on the ephemeris information; determining a validity state of the ephemeris information at a time of detecting the trigger; if the validity state is an invalid state, acquiring updated ephemeris information; and performing the operation based on the ephemeris information or the updated ephemeris information.

Example 16 includes the method of example 15, further comprising: receiving a validity period value that corresponds to one or more parameters of the ephemeris information; and determining the validity state based on the validity period value.

Example 17 includes the method of example 16, wherein the validity period value corresponds to a plurality of parameters of the ephemeris information.

Example 18 includes the method of example 15, further comprising: determining the validity state of a parameter of the ephemeris information is an invalid state; and acquiring a system information block (SIB) to update the parameter.

Example 19 includes the method of example 18, wherein the SIB is a periodically broadcast SIB or is an on-demand SIB.

Example 20 includes a method comprising: receiving a plurality of ephemeris parameters in a first system information (SI) message; receiving, in a physical downlink control channel (PDCCH) transmission, an indication that at least one parameter of the plurality of ephemeris parameters has changed; and acquiring, based on the indication, an updated ephemeris parameter from a second SI message.

Example 21 includes the method of example 20, wherein the second SI message comprises a periodically broadcast system information block (SIB) or an on-demand SIB.

Example 22 includes the method of example 20, wherein the PDCCH transmission comprises a downlink control information (DCI) format 1_0.

Example 23 includes the method of operating a device to implement a policy control function (PCF), the method comprising: receiving, from a user equipment (UE), a UE state indication that includes an indication that the UE supports storage of ephemeris information or requests ephemeris information; and transmitting a manage UE policy command that includes meta-information related to ephemeris information, the meta-information to include an identity or type of satellite system, an ephemeris format, a validity time, or a granularity.

Example 24 includes the method of example 23, wherein the meta-information is part of a UE policy container or is a field in a manage UE policy command message.

Example 25 includes the method of example 23, wherein the UE state indication includes an identifier of a satellite system for which ephemeris information is requested or includes an identifier of an orbital type of satellite system for which ephemeris information is requested.

Example 26 may include an apparatus comprising means to perform one or more elements of a method described in or related to any of examples 1-25, or any other method or process described herein.

Example 27 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 may include an apparatus comprising logic, modules, or circuitry to perform one or more elements of a method described in or related to any of examples 1-25, or any other method or process described herein.

Example 29 may include a method, technique, or process as described in or related to any of examples 1-25, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-25, or portions thereof.

Example 31 may include a signal as described in or related to any of examples 1-25, or portions or parts thereof.

Example 32 may include a datagram, information element, packet, frame, segment, PDU, or message as described in or related to any of examples 1-25, or portions or parts thereof, or otherwise described in the present disclosure.

Example 33 may include a signal encoded with data as described in or related to any of examples 1-25, or portions or parts thereof, or otherwise described in the present disclosure.

Example 34 may include a signal encoded with a datagram, IE, packet, frame, segment, PDU, or message as described in or related to any of examples 1-25, or portions or parts thereof, or otherwise described in the present disclosure.

Example 35 may include an electromagnetic signal carrying computer-readable instructions, wherein execution of the computer-readable instructions by one or more processors is to cause the one or more processors to perform the method, techniques, or process as described in or related to any of examples 1-25, or portions thereof.

Example 36 may include a computer program comprising instructions, wherein execution of the program by a processing element is to cause the processing element to carry out the method, techniques, or process as described in or related to any of examples 1-25, or portions thereof.

Example 37 may include a signal in a wireless network as shown and described herein.

Example 38 may include a method of communicating in a wireless network as shown and described herein.

Example 39 may include a system for providing wireless communication as shown and described herein.

Example 40 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processing circuitry to:

receive, from a user equipment (UE) via non-access stratum (NAS) signaling, a UE state indication that includes an indication that the UE supports storage of ephemeris information or requests ephemeris information; and generate, for transmission via NAS signaling, a manage UE policy command that includes meta-information related to ephemeris information, the meta-information to include a granularity associated with the ephemeris information.

2. The one or more non-transitory, computer-readable media of claim 1, wherein the meta-information is part of a UE policy container or is a field in a manage UE policy command message and the granularity indicates that the ephemeris information is a first type associated with a first validity period or a second type associated with a second validity period.

3. The one or more non-transitory, computer-readable media of claim 1, wherein the UE state indication includes an identifier of a satellite system for which ephemeris information is requested or includes an identifier of an orbital type of satellite system for which ephemeris information is requested.

4. The one or more non-transitory, computer-readable media of claim 1, wherein the UE state indication includes:
an identifier of a satellite system for which ephemeris information is requested.

5. The one or more non-transitory, computer-readable media of claim 4, wherein the identifier is to indicate an orbital type of satellite system for which ephemeris information is requested.

6. The one or more non-transitory, computer-readable media of claim 4, wherein the identifier is to identify a public land mobile network (PLMN), and the UE state indication is to request ephemeris information for satellite systems associated with the PLMN.

7. A method comprising:
generating one or more system information blocks (SIBs) to include first and second ephemeris related to a non-terrestrial network (NTN) device, the first ephemeris being associated with validity periods less than a predetermined threshold and the second ephemeris being associated with validity periods greater than the predetermined threshold;
outputting the one or more SIBs for transmission in an NTN;
detecting a change in the first ephemeris;
refraining from triggering a system information (SI) modification procedure based on detecting the change in the first ephemeris;
detecting a change in the second ephemeris; and
triggering the SI modification procedure based on detecting the change in the second ephemeris.

8. The method of claim 7, wherein generating the one or more SIBs comprises:
generating a first SIB to include the first ephemeris; and
generating a second SIB to include the second ephemeris.

9. The method of claim 7, wherein generating the one or more SIBs comprises:
generating one SIB having one or more fields for the first ephemeris and at least one field for the second ephemeris.

10. The method of claim 7, further comprising:
transmitting, in the one or more SI messages or a radio resource control (RRC) reconfiguration message, indications of a plurality of validity period values for a corresponding plurality of components of the first and second ephemeris.

11. The method of claim 7, wherein the first and the second ephemeris is for a serving cell or a neighbor cell.

12. An apparatus comprising:
processing circuitry to:
receive a first system information block (SIB) that includes first ephemeris information associated with a satellite, a first timer value associated with the first ephemeris information, second ephemeris information associated with the satellite, and a second timer value associated with the second ephemeris information;
detect a trigger of an operation that is based on the first or second ephemeris information;
determine a validity state of the first or second ephemeris information received in the first SIB based on a timer started with the respective first or second timer value; and
determine, based on the validity state, whether to acquire updated ephemeris information, in a second SIB, for the operation;
interface circuitry coupled to the processing circuitry to enable communication.

13. The apparatus of claim 12, wherein the first timer value is associated with a first validity period of the first ephemeris information received in the first SIB, and the second timer value is associated with a second validity period of the second ephemeris information received in the first SIB.

14. The apparatus of claim 12, wherein the processing circuitry is further to:
acquire the updated ephemeris information from the second SIB based on the timer.

15. The apparatus of claim 12, wherein the processing circuitry is further to:
start the timer based on receipt of the SIB.

16. The apparatus of claim 12, wherein the operation is a cell access operation, a cell reselection operation, or a time or frequency pre-compensation operation.

17. A method comprising:
generating system information that includes first ephemeris information associated with a satellite, a first timer value associated with the first ephemeris information, second ephemeris information associated with the satellite, and a second timer value associated with the second ephemeris information; and
generating a system information block (SIB) to include the system information, the SIB to be transmitted to a user equipment (UE).

18. The method of claim 17, wherein the system information further includes an epoch time associated with the first or second ephemeris information.

* * * * *